E. R. BROCK.
ADJUSTABLE BEARING.
APPLICATION FILED AUG. 12, 1915.
1,167,375.
Patented Jan. 11, 1916.
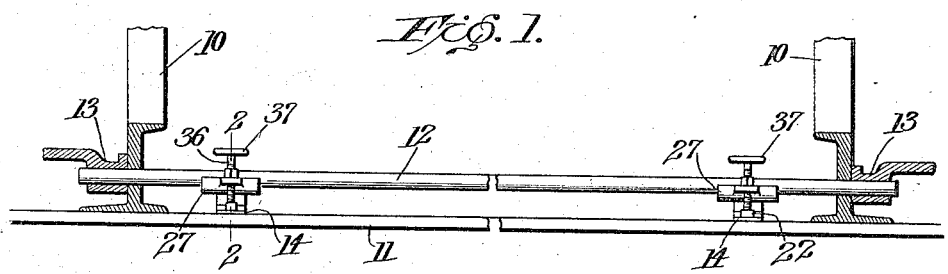
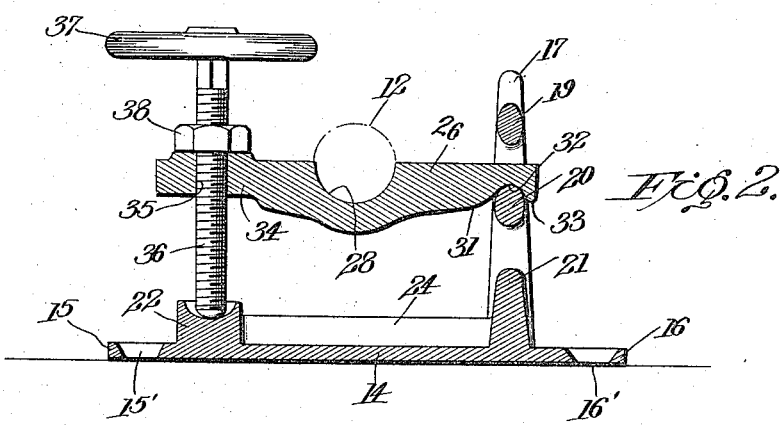
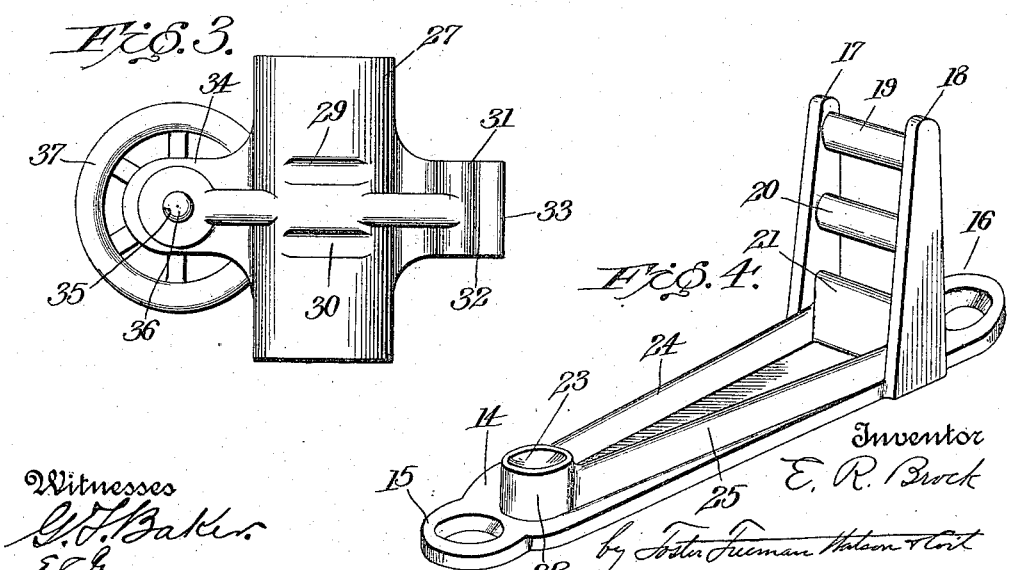
Witnesses
Inventor
E. R. Brock
by Foster Freeman Watson & Nort
Attorney

UNITED STATES PATENT OFFICE.

ELLIS R. BROCK, OF BELTON, SOUTH CAROLINA, ASSIGNOR OF ONE-HALF TO MEDICUS F. DAY, OF BELTON, SOUTH CAROLINA.

ADJUSTABLE BEARING.

1,167,375.  Specification of Letters Patent.  Patented Jan. 11, 1916.

Application filed August 12, 1915. Serial No. 45,186.

*To all whom it may concern:*

Be it known that I, ELLIS R. BROCK, a citizen of the United States, residing at Belton, Anderson county, State of South Carolina, have invented certain new and useful Improvements in Adjustable Bearings, of which the following is a specification.

My invention relates to adjustable bearings and has particular reference to an improved bearing adapted for use in connection with the rocker shafts of looms.

The present invention comprises an improvement on the form of bearing shown, described and claimed in Patent No. 1,157,851, granted to M. F. Day, October 26, 1915.

The principal object of the invention is to provide a supplemental adjustable bearing which will compensate for the wear on the main or fixed bearings of the rocker shaft of a loom. The wear on the fixed bearings of a rocker shaft is at the bottom thereof and causes the shaft to work loosely and vibrate. This vibration or "whipping" produces "seconds" and thin places in the cloth.

It is therefore the object of this invention to provide a bearing which may be set in place between the main bearings of the rocker shaft and which will support the shaft in case of wear and prevent vibration.

A further object of the invention is to form the adjustable bearing as an attachment for the loom, and so constructed that it may be easily set in place.

Further objects and the novel features of my invention will be apparent from the following description taken in connection with the drawing, in which, Figure 1 is a view illustrating so much of a loom and rocker shaft thereon as is necessary to show the application of the adjustable bearing of this invention thereto; Fig. 2 is an enlarged longitudinal sectional view of the adjustable bearing, taken on the line 2—2 of Fig. 1: Fig. 3 is a bottom plan view of the bearing block and the adjusting screw thereon; and Fig. 4 is a perspective view of the base of the adjustable bearing.

In the drawing the numeral 10 designates the side frame members of the loom which are mounted on the floor 11 or other suitable support. The rocker shaft 12 extends across the space between the frame members 10, 10 and through them. Fixed bearings, 13, 13 are provided on the outer sides of the frame members 10 to receive the ends of the rocker shaft 12, the bearings 13, 13 being supported by brackets or other suitable means, not shown. The rocker shaft 12 is therefore supported at its ends in fixed bearings on the frame of the loom and as it oscillates the greater part of the thrust will be on the bottoms of the bearings which will cause the wear at those points, which will result in vibration and lost motion in the rocker shaft and produce an inferior product. In order to compensate for this lost motion in the rocker shaft without renewing the main bearings or the rocker shaft, I provide the adjustable bearings of this invention which are set between the main bearings. One is preferably set near each frame member 10.

The adjustable bearing comprises a base, shown in section in Fig. 2 and in perspective in Fig. 4. The base consists of a base plate 14 which has the ears 15 and 16 at the opposite ends thereof provided with holes 15' and 16' to receive screws whereby the base may be fastened in place at the desired point on the floor 11 or other support beneath the rocker shaft 12. The base consists of an integral casting and at one side it has cast integral therewith two upright members 17 and 18 which are connected by the spaced cross members 19, 20 and 21 which constitute the supporting members at different distances above the base. At the opposite end of the base plate 14 there is a boss 22 formed integral with the base plate and provided in its top with a socket 23, for a purpose to be set forth. The top surface of the base plate 14 also has cast integral therewith two ribs 24 and 25 which extend between the boss 22 and the upright members 17 and 18 and strengthen the structure.

The block 26 for engaging and supporting the shaft consists of a casting which has an elongated part 27 intermediate its ends. The part 27 is provided in its upper surface with a semi-cylindrical groove 28 adapted to receive and have extensive engagement with the rocker shaft 12. The under side of the part 27 has therein two transverse grooves 29 and 30 which are adapted to fit the ribs 24 and 25 when the block 26 is in its lowermost adjusted position.

The block 26 has a part 31 which extends laterally from one side of the center part 27 and is provided on its under side near the end thereof with a groove 32 adapted to fit and fulcrum the block on any one of the cross members 19, 20 or 21. The groove 32 is so shaped that it will prevent the release of the block 26 from supporting engagement on those cross members, and has the advantage that it requires no adjusting screw or other special devices to hold the block in position at that end, since the lateral movement thereof on each of the cross members 19, 20 and 21 is limited by the upright members 17 and 18 and the endwise movement thereof is limited by the downwardly projecting end or hook 33. The hook formed at the end of the block 16 loosely interengages with the transversely extending spaced supports above the base without fastening means. The opposite side of the block 26 has a part 34 extending laterally from the center part 27 and provided with a threaded hole 35 to receive the adjusting screw 36. The lower end of the adjusting screw 36 rests in the socket 23 in the base plate and it is provided at its upper end with a handle 37 by means of which it may be turned to raise and lower that end of the block 26. A nut 38 is provided to limit the extent to which the block may be raised.

The use and operation of the attachment will be obvious from the foregoing description. The base having been secured in the position desired beneath the rocker shaft 12, the end 31 of the block 26 may be slipped into position in the space above any one of the cross pieces 19, 20 or 21, depending on the height of the shaft 12. The groove 32 will fit the particular cross piece on which it is to be supported and prevent the release of the block 26 at that end. The block is also fulcrumed at that end. At its opposite end, by turning the handle 37 and adjusting the screw 36 the intermediate part 27 may be raised into engagement with the shaft 12 and support the latter so that it will not vibrate.

I do not wish to be limited to the exact details as shown and described as it is clear that various minor changes may be made in the construction without departing from the spirit of the invention.

Having thus described the invention what is claimed is:

1. An adjustable bearing comprising a block provided in its upper surface with a groove constituting a bearing for a shaft, a base, a horizontal support mounted on said base and disposed above the same, said block having means at one side thereof loosely interengaging with said support, and means for adjustably supporting the other side of said block whereby said bearing may be raised and lowered.

2. An adjustable bearing comprising a block provided in its upper surface with a groove constituting a bearing for a shaft, a base, a support mounted on said base at a distance above the same, said block having a hook at one side thereof interengaging with said support whereby said block is adapted to be readily disengaged from said support, and screw threaded means for adjustably supporting the other side of said block whereby said bearing groove may be raised and lowered.

3. An adjustable bearing comprising a block provided in its upper surface with a groove constituting a bearing for a shaft, a base, spaced horizontal supports above the base for supporting one side of said block at different distances above the base, said block having means at one side thereof adapted to engage any one of said supports, and means for adjustably supporting the other side of said block whereby said bearing groove may be raised and lowered.

4. An adjustable bearing comprising a base plate, upright members on said base plate at one side thereof, a cross piece extending between said upright members, a block provided in its upper surface with a groove constituting a bearing for a shaft, said block having means at one side thereof adapted to interengage with said cross piece whereby said block is supported on said cross piece and readily detachable therefrom, said upright members limiting the lateral movement of the end of said block supported on said cross piece, and means for adjustably supporting the other side of said block whereby said bearing groove may be raised and lowered.

5. An adjustable bearing comprising an integral base provided at one side thereof with upright members and spaced horizontal cross pieces between said upright members, a block provided in its upper surface with a groove constituting a bearing for a shaft, said block having a hook at one side thereof adapted to engage any one of said cross pieces, said upright members limiting the lateral movement of the block along the cross pieces, and means for adjustably supporting the other side of said block whereby said bearing groove may be raised and lowered.

6. An adjustable bearing comprising an integral base provided at one side with a socket and having at the other side upright members connected by spaced horizontal supporting bars, a block provided in its upper surface with a groove constituting a bearing for a shaft, said block having a recess on the under side thereof at one end and providing a hook to fit any one of said supporting bars and so designed that said block may be readily engaged and disengaged with any one of said supporting bars to support that end of the block at different distances above the base, and a screw threaded device fitting said socket at the other side of the base and adapted to adjustably support the other side of said block whereby said bearing groove may be raised and lowered.

7. In a loom, the combination with a rocker shaft of fixed bearings surrounding and supporting said shaft and means for supporting said shaft near and between said fixed bearings comprising bases adapted to be secured in place beneath said shaft and blocks provided with bearing grooves in their upper faces adapted to fit below and against said shaft, said blocks and bases having at corresponding ends thereof interfitting parts whereby the blocks may be passed beneath the shaft and interengaged with the supporting means on the base and held in place without additional fastening means, and means for supporting and vertically adjusting the other ends of said blocks whereby they will support said shaft and prevent vibration.

In testimony whereof I affix my signature.

ELLIS R. BROCK.

Copies of this patent may be obtained for five cents each, by addressing the "Commissioner of Patents, Washington, D. C."